United States Patent
Brightwell et al.

(10) Patent No.: US 7,123,657 B2
(45) Date of Patent: *Oct. 17, 2006

(54) VIDEO PROCESSING SYSTEM ALSO COMPRESSING CODING DECISION DATA

(75) Inventors: Peter John Brightwell, London (GB); Nicholas Dominic Wells, Brighton (GB); Phillip Nicholas Tudor, Horley (GB)

(73) Assignee: British Broadcasting Corporation, London (GB)

( * ) Notice: Subject to any disclaimer, the term of this patent is extended or adjusted under 35 U.S.C. 154(b) by 687 days.

This patent is subject to a terminal disclaimer.

(21) Appl. No.: 10/395,517

(22) Filed: Mar. 24, 2003

(65) Prior Publication Data

US 2003/0202604 A1 Oct. 30, 2003

Related U.S. Application Data

(63) Continuation of application No. 09/600,653, filed on Oct. 2, 2000, now Pat. No. 6,577,682.

(51) Int. Cl.
 *H04N 7/12* (2006.01)
(52) U.S. Cl. .............. 375/240.24; 375/240.02
(58) Field of Classification Search ........... 375/240.24, 375/240.28, 240.16, 240.03, 240.13, 240.1, 375/240.02, 240.12; 382/243
 See application file for complete search history.

(56) References Cited

U.S. PATENT DOCUMENTS

| | | | |
|---|---|---|---|
| 4,633,490 A * | 12/1986 | Goertzel et al. ............ 375/240 |
| 5,086,488 A | 2/1992 | Kato et al. |
| 5,142,380 A | 8/1992 | Sakagami et al. |
| 5,249,053 A | 9/1993 | Jain |
| 5,438,625 A | 8/1995 | Klippel |
| 5,512,956 A | 4/1996 | Yan |
| 5,629,779 A | 5/1997 | Jeon |
| 5,642,115 A | 6/1997 | Chen |
| 5,671,298 A | 9/1997 | Markandey et al. |
| 5,748,245 A | 5/1998 | Shimizu et al. |
| 5,802,218 A | 9/1998 | Brailean |
| 5,831,688 A | 11/1998 | Yamada et al. |
| 5,870,146 A * | 2/1999 | Zhu ................ 375/240.03 |
| 5,930,398 A | 7/1999 | Watney |
| 5,991,456 A | 11/1999 | Rahman et al. |
| 6,005,952 A | 12/1999 | Klippel |
| 6,081,295 A | 6/2000 | Adolph et al. |
| 6,088,393 A | 7/2000 | Knee et al. |
| 6,151,362 A | 11/2000 | Wang |
| 6,163,573 A | 12/2000 | Mihara |
| 6,269,120 B1 | 7/2001 | Boice et al. |
| 6,278,735 B1 | 8/2001 | Mohsenian |
| 6,285,716 B1 | 9/2001 | Knee et al. |
| 6,437,827 B1 | 8/2002 | Baudouin |

(Continued)

FOREIGN PATENT DOCUMENTS

EP 0 637 893 A1 2/1995

(Continued)

OTHER PUBLICATIONS

Re-Codable Video, Massachusetts Institute of Technology, Media Laboratory; Manuela Pereira and Andrew Lippman; pp. 952-956; Nov. 13, 1994; Cambridge, Massachusetts.

*Primary Examiner*—Gims Philippe
(74) *Attorney, Agent, or Firm*—Michael Best & Friedrich LLP

(57) ABSTRACT

An MPEG2 decoded video signal is accompanied by a representation of the coding decisions to aid downstream re-encoding. The representation is an MPEG compliant bit modified to reduce the number of bits.

17 Claims, 3 Drawing Sheets

U.S. PATENT DOCUMENTS 6,539,120 B1    3/2003    Sita et al.
6,570,922 B1    5/2003    Wang et al.
6,990,248 B1 *    1/2006    Pardas et al. ............... 382/243

FOREIGN PATENT DOCUMENTS

| | | |
|---|---|---|
| EP | 0 696 873 A2 | 2/1996 |
| GB | 2 240 005 B | 7/1991 |
| WO | WO 95/35628 | 12/1995 |
| WO | WO 97/40626 | 10/1997 |
| WO | WO 98/03017 | 1/1998 |

* cited by examiner

VIDEO PROCESSING SYSTEM ALSO COMPRESSING CODING DECISION DATA

This application is a continuation of U.S. application Ser. No. 09/600,653, filed Oct. 2, 2000 now U.S. Pat. No. 6,577,682.

This invention concerns the handling of compressed or bit-rate reduced signals.

In the most important example, this invention relates to the MPEG2 video compression system and the following description will take MPEG2 as an illustrative compression (or bit-rate reduction) system.

As compressed video increasingly find its way into the program chain, it becomes more likely that bitstreams will be decoded and re-encoded. Examples of where this happens include switching between different bitstreams and changing between bit-rates and compression formats. It is important that unnecessary loss of quality is avoided in these cases.

There is proposed in U.S. Pat. No. 6,285,716, which is assigned to the assignee of the present application, a solution in which an information bus accompanies a decoded signal and is available in a subsequent encoding process. In apparatus and channels designed for this purpose, it is possible for the decoded, picture signal to be accompanied by an information bus which contains all the side information which is contained in the MPEG signal, alongside the DCT coefficients. The information bus may also contain additional information which is related to the control of the coding or decoding process but which does not form part of the coded bitstream. It can include, for example, statistical information, information concerning errors together with instructions for use in error concealment, candidate motion vectors or recommended quantizer step sizes.

There are disclosed in United States Patent Application Publication Ser. No. 2002/0,118,760, which is assigned to the assignee of the present application, techniques by which an information bus can pass along a video pathway. One method uses an information bus embedded in the lowest bits of the decoded video signal (in ITU-R Rec. 656 format), such that the picture quality is not visibly affected. In one version of this, the video bits used to convey a particular coding decision are spatially and temporally locked to the area of the picture to which it corresponds. Alternatively, the information may take a different form, for instance using non-active parts of the picture, such as the vertical blanking interval (VBI), or by using a separate channel.

A problem arises where it is not possible to embed the information bus in the video signal without suffering excessive data loss and where the equipment concerned has not been designed with an appropriate channel to carry the information bus separately. An example of this is when the video signal is recorded by a digital VTR that employs DCT-based compression, which tends to change the lowest bits of the signal.

Accordingly, the present invention consists in one aspect in a video compression system in which an encoder operates on a video signal and takes coding decisions in a compression encoding process to generate an encoded signal and in which a decoder operates on the encoded signal in a compression decoding process to generate a decoded signal, wherein a representation of the coding decisions or some of them is provided in bit-rate reduced form and accompanies the decoded signal through a bit-rate reduced channel.

The bit-rate reduced channel may take a variety of forms including one or more audio channels (such as VT audio tracks or a separate audio recorder); unused VBI lines, a video channel with significant error correction and appropriate data channels (including DVCpro data channels).

For the case of an MPEG-2 bitstream, the coding decisions typically include:
Picture dimensions
Frame rate
Picture structure (frame-coded or field-coded
Picture type (I, P or B)
Whether macroblocks intra-coded or use prediction
Whether forward, backward or bi-directional prediction is used
Whether frame-based or field-based prediction is used
Motion vectors
Quantiser visibility weighting matrices
Quantiser step
Buffer state of a decoder that is decoding the bitstream
Information on bit-rate usage within the bitstream When it is possible to keep all (or a sufficient sub-set of) the decisions the same on re-coding, it can be shown that the switch is transparent. In other cases, such as when a new bitrate is used on re-coding, it is still advantageous to reuse many decisions (e.g. picture type and motion vectors), and take account of others (e.g. quantiser scale).

In one form of the invention, the bit-rate reduced coding decisions pass through a convenient separate channel such as one or more audio channels. An alternative is to use the bit-rate reduction of the coding decisions to enable them to be embedded in the video signal in a more robust manner, such that they can be recovered without errors.

Where the chosen channel has insufficient capacity to support sending the coding decisions with fixed length codewords, variable length coding can be used. However, use of variable length coding means that the short-term bit-rate can exceed that which fixed-length coding would give, and some method of reducing this is required.

This invention, in one aspect, provides for decisions to be modified to reduce their bit-rate whilst signaling to the re-coder that the decisions have been changed and so no longer correspond to the original bitstream.

Another aspect of this invention addresses the problem that where an information bus is embedded in a video signal, it is not possible to detect where parts of the picture have been changed by caption insertion, cross-fades, and the like.

Another embodiment of this invention can be used for converting between an information bus embedded in the video signal and a side-channel based information bus. This would be typically used for integrating a DCT-based VTR into an ITU-R Rec. 656 infrastructure.

One embodiment of this invention consists in a system for producing a bit-rate reduced representation of coding decisions suitable for passing through a channel (comprised of e.g. one or more audio channels) in which the available bit-rate may be insufficient to carry the coding decisions themselves. Preferably, variable length coding of the information is employed.

The following are examples of this aspect of the invention:

A. An MPEG-compliant video bitstream, with "dummy" coefficients and coded block patterns inserted to keep the bitstream legal. These would not represent the coefficients and coded block patterns used for the original bitstream, but would give the shortest legal codewords.

B. A bitstream that uses a modified version of the MPEG format in which the macroblock syntactical element is altered so that it no longer includes coefficients or a coded block pattern. This would mean a small change in the way in which the bitstream is decoded.

C. As form B, but in addition, some of the coding decisions, in particular the motion vectors, are coded in a non-compliant way in order to reduce their bit-rate. Depending on how this is done (methods for this are described below), there may be a small or a large change to the way in which the bitstream is decoded.

The invention will now be described by way of example with reference to the accompanying drawings, in which.

Figure 1:
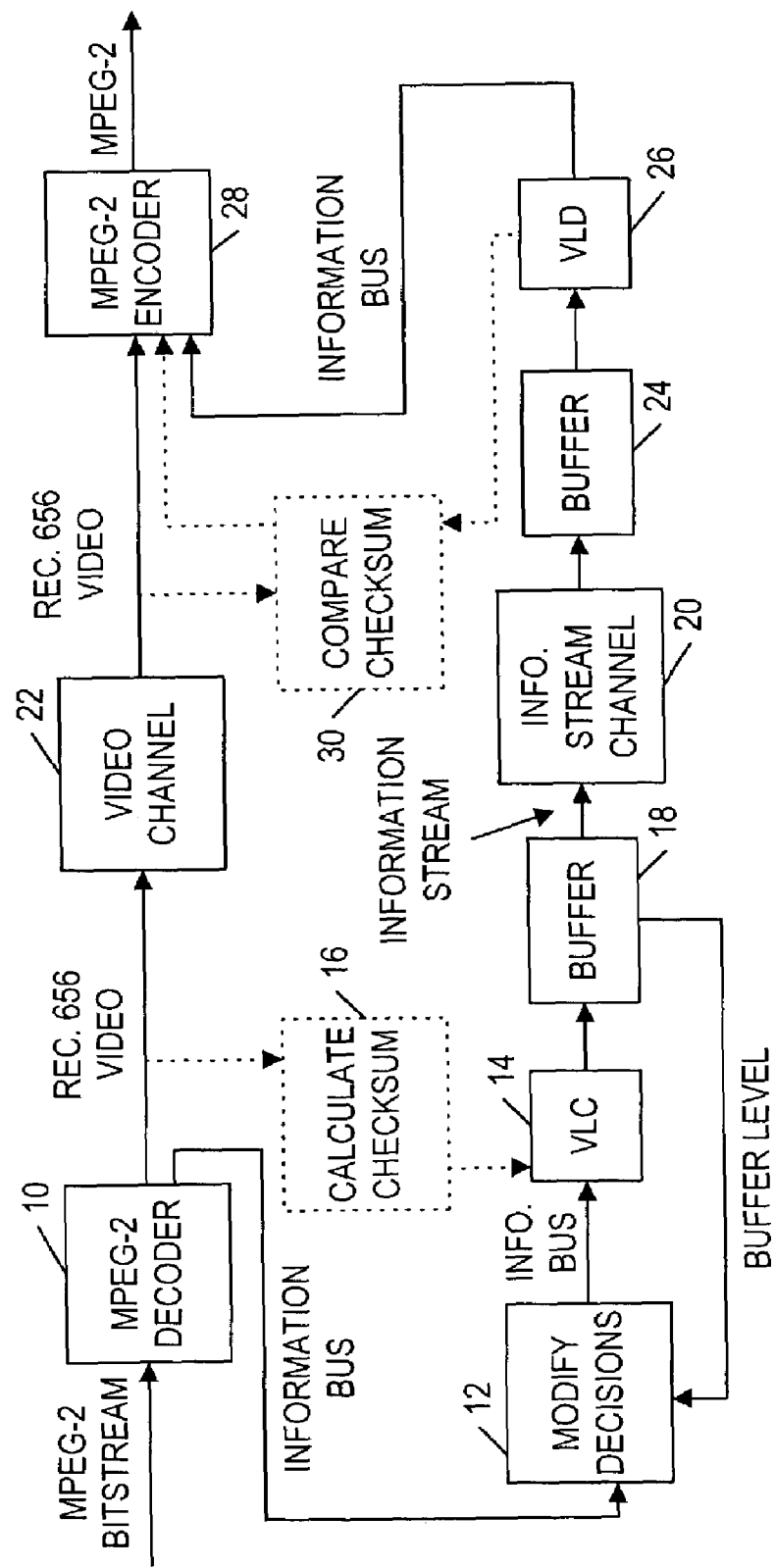
FIG. 1 shows a system according to this invention in which an MPEG bitstream is decoded for passage through a video channel to a encoder, with coding decisions being taken from the decoder and bit-rate reduced for passage through an information stream channel which accompanies the video channel to the encoder.

Referring initially to FIG. 1, this shows a system in which an MPEG bitstream is decoded in MPEG-2 decoder (10) to produce a Rec. 656 video signal and a separate output of coding decisions, that are extracted from the bitstream. The latter would be typically take the form of an "Information Bus" as described in U.S. Pat. No. 6,285,716. The coding decisions, in particular the motion vectors, if necessary are then modified (as described below) in the modify decisions block (12) to reduce the number of bits required to code them. They are then variable length coded in VLC (14) using one of the above forms. Additional information can be added through to signal whether modification was performed. The resulting bitstream is then buffered in buffer (18) to form an Information Stream. This is then adapted to the particular channel (for instance it may be multiplexed between a number of audio bitstreams which are sent to an audio recorder). The level of the buffer (18) is sent back to block (12) to control the modification process and hence the short-term bit-rate entering the buffer.

After passing through the Information Stream channel (20) and subsequent buffering in buffer (24), the Information Stream passes to a VLD (26). The Information Stream channel (20) accompanies the video channel (22) which would typically include equipment such as a VTR. The decoded Information Stream can then be used by an MPEG encoder (28) whose input is the output of the video channel. Where the Information Stream contains information signaling that the coding decisions have been modified, the encoder may then remake some or all of the decisions.

There a number of possible options for modifying the coding decisions to reduce the number of bits required to code them:

1. Macroblocks can have up to four motion vectors, depending on the type of prediction and motion compensation employed. Fewer, or no, motion vectors can be sent (this will require changes to other MPEG syntactical elements: macroblock_type and motion_type). Motion vectors can be replaced with dummy motion vectors that code more efficiently and a flag set to mark the motion vectors as invalid.

2. Motion vectors are coded differentially in MPEG, using a set of predictors that can be updated on a macroblock rate. The number of bits required to code a given motion vector increases with the size of the corresponding differential. Therefore motion vectors with large differentials can be modified to have a smaller differential, including the case of zero differential.

3. The MPEG syntax contains picture rate elements that specify the horizontal and vertical ranges of motion vectors that will appear in the forthcoming picture (the f_code values). The value of these affect how many bits are used to code the (differential) motion vectors. By employing options 1 and/or 2, it may be possible to modify the f_code values and code the remaining motion vectors in fewer bits.

4. There is an overhead (6 bits) where the quantisation step parameter changes between adjacent macroblocks. By changing the quantisation step parameters to be the same, this overhead is removed.

In addition there are refinements concerning when to employ the above techniques, in order to minimize the number of macroblocks that must be modified to save a given number of bits in the Information Stream. The purpose of doing this is to maximize the amount of video signal that can be re-coded transparently:

1. B-pictures can use bi-directional prediction and so tend to require more bits for their coding decisions, especially motion vector bits. Because of this, and also because any loss in transparency on re-coding is not propagated to other pictures, macroblocks in B-pictures should typically be modified with higher priority than those in other types of picture.

2. Macroblocks around the edges of the picture should have higher priority than those nearer the center, because loss of transparency is less likely to be noticed around the edges.

3. By "looking ahead" a number of macroblocks, it may be possible to "spot" sequences of macroblocks that would give a good bit-rate saving.

When modification is performed, one or more of the following methods can be used of conveying this information:

1. One or more new syntactical elements are added to the bitstream. This method is not possible for form A of the Information Stream (the MPEG-compliant form).

2. Unused values of certain syntactical elements can be used. In particular, removing the coefficients from the syntax removes the need the "Not coded" values of macroblock_type. These can be reused to indicate that the decisions have been modified. This method is not possible for form A of the Information Stream.

3. For form A only, the information can be conveyed in the choice of the dummy values of the coefficients and/or coded block patterns inserted to keep the Information Stream as a legal MPEG bitstream.

4. User data is used.

For form C of the Information Stream, non-compliant coding is used to give greater reduction in bit-rate. Examples of methods to do this include:

1. A more complex motion vector predictor is used, for instance a two dimensional predictor that takes account of the vectors used in the macroblocks above the current one as well as the macroblock to the left of it.

2. A model is calculated for the picture, or a portion of it, that provides a simplified description of a coding decision. Typically user data would be used to send the model at the start of the picture. Macroblock-rate information is used to describe deviations from this model. For motion vectors, the model can be considered as an advanced predictor.

3. Techniques such as quadtree coding are suitable for decisions that only have a relatively small number of possible values, such as macroblock_type, motion_type and DCT_type. Quadtree coding can also be used to code vectors that appear in a "menu" —and reference is directed in this regard to GB 2240005.

All the above methods can be extended to allow modification of the coding decisions where necessary, and again any modifications could be signalled in the Information Stream.

An enhancement to the system described here is shown by the dotted lines in FIG. 1. Information is added to the Information Stream, typically as user data, that gives information about the decoded video signal. When the Information Stream is decoded, the information can be checked against the video to be re-coded. This will enable the re-coder to make new coding decisions where the video signal has been changed substantially, for instance where captions have been added. Typically the information would be a macroblock-rate checksum (calculated in block (16) and compared in block (30)) if the video channel is transparent, or a macroblock-rate measure of mean and variance, if the video channel is not transparent (e.g. when it passes through a VTR). Statistical measures other than mean and variance can be employed, and can be calculated on picture regions other than macroblocks.

An alternative approach that does not require statistical or check sum information is to include additional elements in the Information Stream that allow a processing unit in the Information Stream Channel to signal explicitly that the decoded video signal has been changed. The nature and degree of change can optionally be included in the signal. Typically, there would be required one additional bit added per macroblock to the Information Stream. Such an arrangement would be useful where processing such as logo insertion, wiping or keying is performed on a JPEG or DV based editing system.

Figure 2:
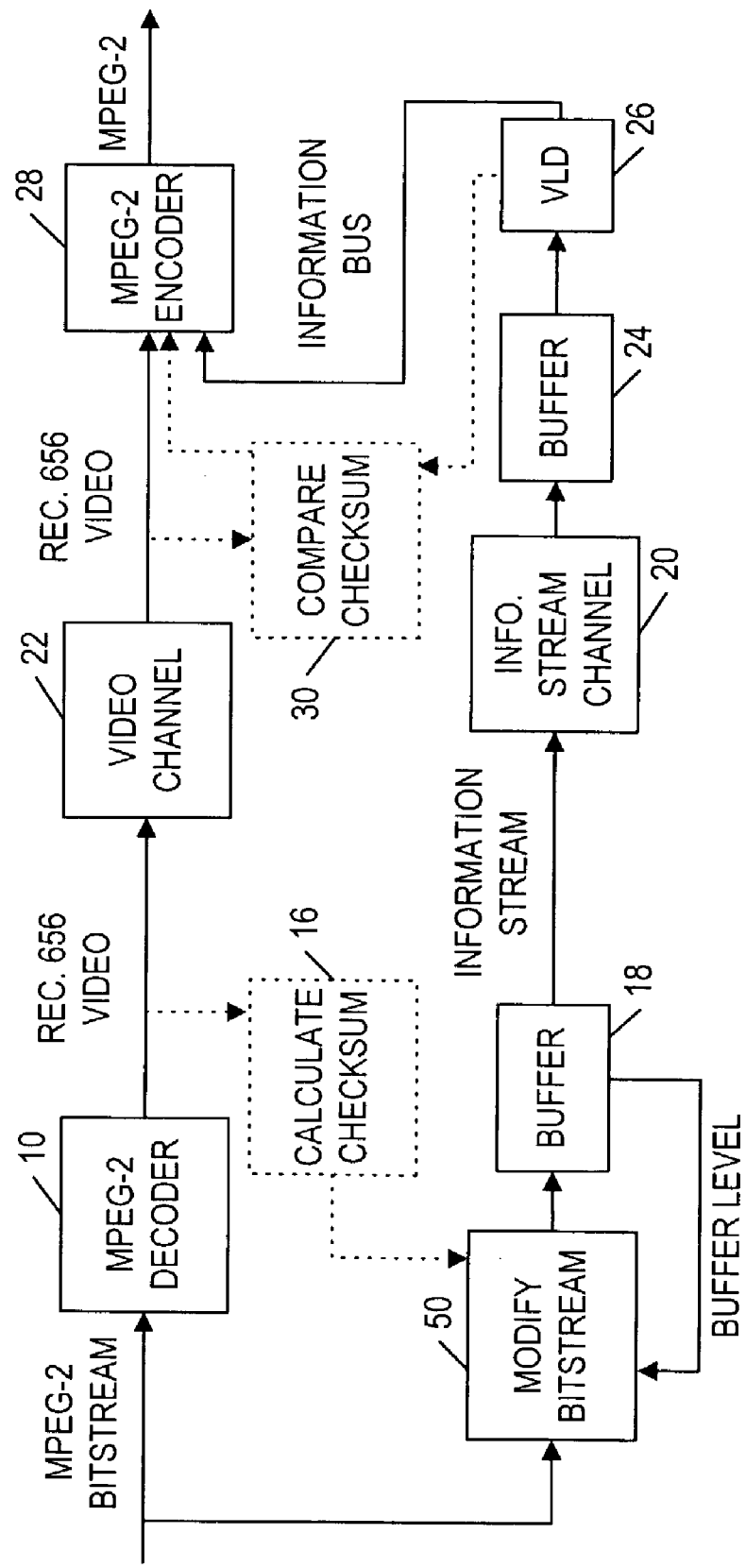
FIG. 2 illustrates a modification in which coding decisions are extracted from the MPEG bitstream, in front of the decoder.

A variant of the invention is shown in FIG. 2, where blocks serving the same function as blocks in FIG. 1 are given the same reference numeral and not described further. In FIG. 2, rather than coding the Information Stream from the decisions extracted from the bitstream, the MPEG codewords representing the decisions are stripped out and passed to block (50) with changes made as required where there is a need to modify decisions or add additional information. The "modify bitstream" block (50) thus serves an analogous function to "modify decisions" block (12), although operating on variable length coded representations of the coding decisions, rather than the coding decisions themselves.

Figure 3:
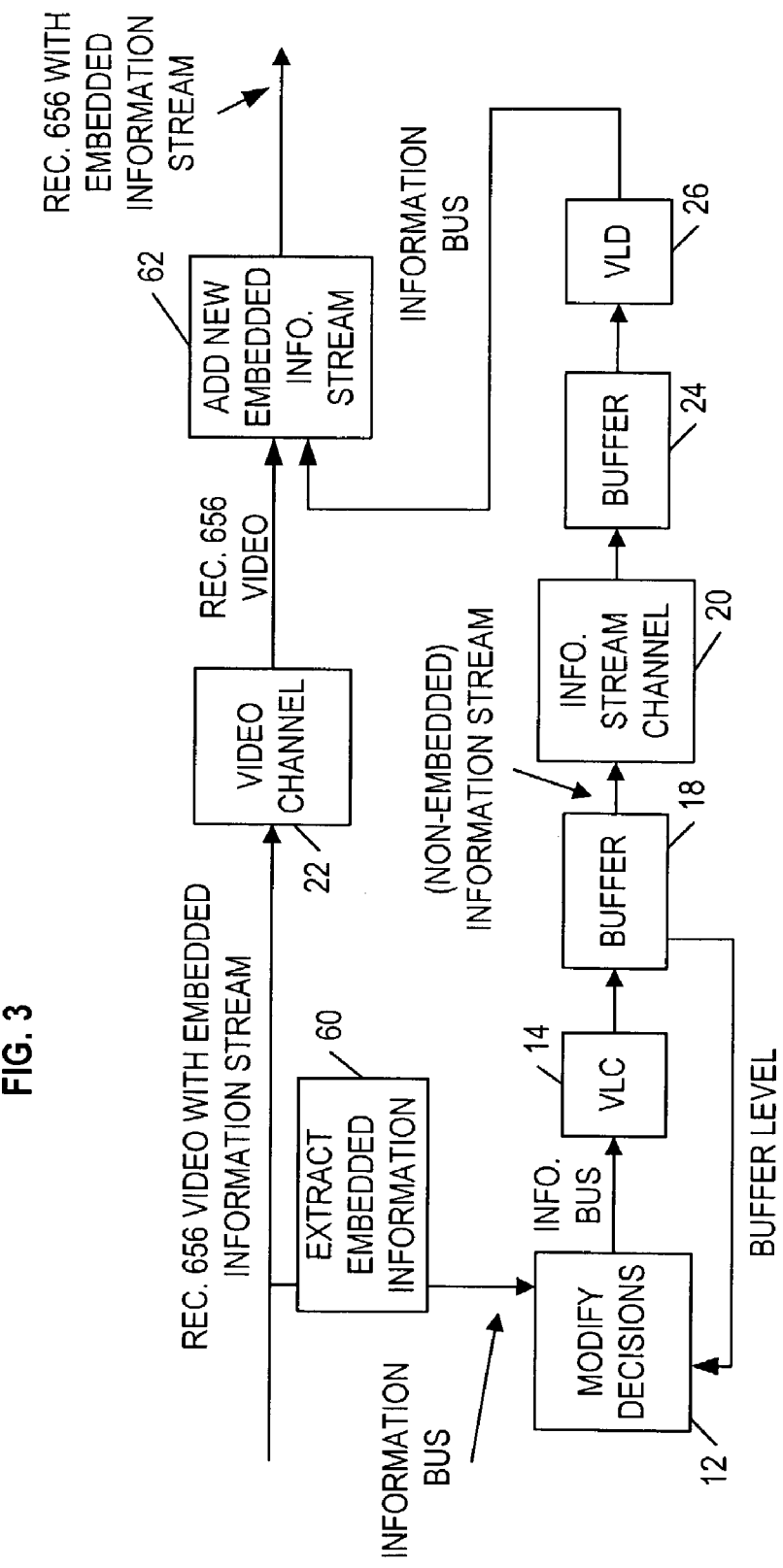
FIG. 3 shows a system according to the invention in which coding decisions embedded in a video signal are extracted before the video signal passes through—for example—a digital VTR.

Another variant is shown in FIG. 3. Here, an Information Stream that is embedded in a video signal (as mentioned above and as described in U.S. patent application Publication Ser. No. 2002/0118,760) is converted into one of the formats described, and back again. This is suitable for adapting a VTR etc. into an infrastructure which otherwise employs an embedded Information Stream. More specifically, FIG. 3 shows a block (60) which serves to extract an embedded information bus from an incoming video signal. The extracted information bus is modified and variable length coded in the same manner as shown in FIG. 1, to pass through an Information Stream channel 20. Downstream of the restricted video channel 22, the Information Stream is variable length coded for re-embedding in the video signal at block 62.

The invention claimed is:

1. A video compression system comprising:
    an input for receiving a compressed bitstream which has been compressed in accordance with first compression coding decisions;
    a compression decoder operating to decode the received compressed bitstream to provide a decompressed video signal;
    means for extracting the first compression coding decisions from the compressed bitstream and generating therefrom an information signal representing the first compression coding decisions;
    coding decision modifying means for modifying the first compression coding decisions represented in the information signal such that the information signal representing such modified compression coding decisions has a reduced bit rate as compared with the information signal representing the first compression coding decisions; and
    a downstream compression encoder arranged to receive the decompressed video signal through a video channel and the information signal through an information channel and to re-encode the decompressed video signal utilizing the information signal representing the modified compression coding decisions to reduce quality loss in the decoding and re-encoding processes.

2. A video compression system according to claim 1, wherein the information signal output by the coding decision modifying means drives a buffer upstream of the information channel, and wherein the level of the buffer is sent upstream to the coding decision modifying means to control the instantaneous bit rate of the information signal entering the buffer.

3. A video compression system according to claim 2, wherein the information signal output by the coding decision modifying means is subjected to variable length coding before entering the buffer.

4. A video compression system comprising:
    an input for receiving a video signal with an embedded information signal representing first compression coding decisions;
    means for extracting the first compression coding decisions from the video signal and generating therefrom an information signal representing the first compression coding decisions;
    coding decision modifying means for modifying the first compression coding decisions represented in the information signal such that the information signal representing such modified compression coding decisions has a reduced bit rate as compared with the information signal representing the first compression coding decisions; and
    a downstream compression encoder arranged to receive the video signal through a video channel and the information signal through an information channel and to re-encode the decompressed video signal utilizing the information signal representing the modified compression coding decisions to reduce quality loss in the re-encoding process.

5. A video compression system according to claim 4, wherein the information signal output by the coding decision modifying means drives a buffer upstream of the information channel, and wherein the level of the buffer is sent upstream to the coding decision modifying means to control the instantaneous bit rate of the information signal entering the buffer.

6. A video compression system according to claim 4, wherein the information signal is re-embedded in the video signal downstream of the information and video channels.

7. A video compression system in which an encoder operates on a video signal in a compression encoding process using coding decisions having motion vectors to generate an encoded signal, and in which a decoder operates on the encoded signal in a compression decoding process to generate a decoded signal, wherein a representation of the coding decisions accompanies the decoded signal for use in a later signal process, wherein the coding decisions are modified to enable the coding decisions to be represented at a reduced bit rate, wherein a representation of the modified coding decisions accompanies the decoded signal, and wherein the modification of the coding decisions includes modification of at least one of the motion vectors.

8. A video compression system according to claim 7, wherein the bit-rate reduced coding decisions are variable length coded.

9. A video compression system according to claim 7, wherein short term control over bit-rate reduction is achieved through modification of the coding decisions.

10. A video compression system according to claim 7, wherein the encoded signal is in accordance with an MPEG standard and the bit-rate reduced representation of the coding decisions includes a bitstream in accordance with the MPEG standard.

11. A video compression system according to claim 10, wherein the bit-rate reduced representation of the coding decisions includes a bitstream in which the coefficients and coded block patterns used for the original bitstream are replaced with dummy coefficients and dummy coded block patterns.

12. A video compression system according to claim 7, wherein the motion vector is modified through replacement of the motion vector by a dummy motion vector.

13. A video compression system according to claim 7, wherein motion vector is modified through deletion of the motion vector.

14. A video compression system according to claim 7, wherein the motion vector is modified through modification of the motion vector to reduce the differential between the motion vector and another motion vector.

15. A video compression system in which an encoder operates on a video signal in a compression encoding process using coding decisions to generate an encoded signal, and in which a decoder operates on the encoded signal in a compression decoding process to generate a decoded signal, wherein a representation of coding decisions accompanies the decoded signal for use in a later signal process, wherein the coding decisions are modified to enable them to be represented at a reduced bit rate, wherein the modified coding decisions are variable length coded and then buffered, wherein information about a level of the buffer is used to control the modification process, and wherein a representation of the modified coding decisions accompanies the decoded signal.

16. A method of performing cascaded decoding and re-encoding processes, the method comprising:

providing a compressed bitstream which has been compressed in accordance with first compression coding decisions;

decoding the compressed bitstream to generate a decompressed video signal;

transferring the decompressed video signal to a downstream compression encoder through a video channel;

extracting the first compression coding decisions from the compressed bitstream to generate an information signal, the information signal representing the first compression coding decisions;

modifying the information signal such that the information signal represents modified compression coding decisions, the information signal representing the modified compression coding decisions having a reduced bit rate as compared with the information signal representing the first compression coding decisions;

transferring the information signal to the downstream compression encoder through an information channel; and re-encoding the decompressed video signal using the information signal representing the modified compression coding decisions to reduce quality loss in the cascaded decoding and re-encoding processes.

17. A video compression system comprising:

a decoder operable to receive a compressed bitstream which has been compressed in accordance with first compression coding decisions, to decode the compressed bitstream to provide a decompressed video signal, to extract the first compression coding decisions from the compressed bitstream, and to generate an information signal representing the first compression coding decisions;

a coding decision modifier operable to modify the first compression coding decisions represented in the information such that the information signal representing such modified compression coding decisions has a reduced bit rate as compared with the information signal representing the first compression coding decisions; and a downstream encoder operable to receive the decompressed video signal through a video channel, to receive the information signal through an information channel, and to re-encode the decompressed video signal utilizing the information signal representing the modified compression coding decisions to reduce quality loss in the decoding and re-encoding processes.

* * * * *

UNITED STATES PATENT AND TRADEMARK OFFICE
CERTIFICATE OF CORRECTION

| | |
|---|---|
| PATENT NO. | : 7,123,657 B2 |
| APPLICATION NO. | : 10/395517 |
| DATED | : October 17, 2006 |
| INVENTOR(S) | : Peter John Brightwell, Nicholas Dominic Wells and Philip Nicholas Tudor |

It is certified that error appears in the above-identified patent and that said Letters Patent is hereby corrected as shown below:

On the Title Page; After Item (63) insert Item --(30) Foreign Application Priority Data Jan. 22, 1998 [GB] United Kingdom,......9801380--.

Signed and Sealed this

Sixth Day of February, 2007

JON W. DUDAS
*Director of the United States Patent and Trademark Office*